United States Patent [19]

Kaneko et al.

[11] Patent Number: 4,909,086
[45] Date of Patent: Mar. 20, 1990

[54] TORQUE SENSOR OF TENSION DIFFERENCE TYPE FOR PULLEY-BELT DRIVING SYSTEM

[75] Inventors: Makoto Kaneko, Tsukuba; Kazuo Tanie, Ushiku; Kazuhito Yokoi, Tsukuba, all of Japan

[73] Assignees: Agency of Industrial Science & Technology; Ministry of International Trade & Industry, both of Tokyo, Japan

[21] Appl. No.: 272,416

[22] Filed: Nov. 17, 1988

[30] Foreign Application Priority Data

Nov. 17, 1987 [JP] Japan .................................. 62-289998

[51] Int. Cl.⁴ .......................... G01L 3/14; G01L 5/10
[52] U.S. Cl. ................................ 73/862.19; 73/862.48
[58] Field of Search ........... 73/862.19, 862.45, 862.47, 73/862.48

[56] References Cited

U.S. PATENT DOCUMENTS 2,472,047  5/1949  Ruge .................................. 73/862.38
3,598,999  8/1971  Hofmeister ................. 73/862.48 X
3,992,932  11/1976  Venema ......................... 73/862.19

FOREIGN PATENT DOCUMENTS 0159021  7/1987  Japan .

Primary Examiner—Charles A. Ruehl
Attorney, Agent, or Firm—Oblon, Spivak, McClelland, Maier & Neustadt

[57] ABSTRACT

A torque sensor for a pulley-belt driving system has a belt passed round a drive pulley and a driven pulley. The torque sensor has a frame having opposite ends respectively in contact with first and second parts of the belt, a beam secured to a stationary body and supporting the frame and strain detection means for detecting the strain of the beam.

2 Claims, 4 Drawing Sheets

TORQUE SENSOR OF TENSION DIFFERENCE TYPE FOR PULLEY-BELT DRIVING SYSTEM

BACKGROUND OF THE INVENTION

1. Field of the Invention

This invention relates to a torque sensor used for detecting the torque in a pulley-belt driving system having a belt wound on drive and driven pulleys.

2. Prior Art Statement

In the pulley-belt driving system, a belt is wound on a drive pulley driven by a motor and on a drive pulley receiving motion from the drive pulley, and the motor motion is transmitted to the driven pulley utilizing the tension in the belt. This system is used in various power transmission systems, and recently is also used for driving robot hands or fingers.

The motion of the robot hand or finger requires accurate position and power control. Therefore, for employing the pulley-belt driving system for the driving of a robot hand or finger, the torque of the system has to be controlled accurately. To achieve this end purpose, accurate measurement of torque is necessary.

FIG. 5 shows an example of the prior art torque sensor for a pulley-belt driving system.

Referring to FIG. 5, reference numeral 5 designates the pulley-belt driving system, which comprises a belt 4 fixed to a drive pulley 2 at a point and to a driven pulley 3 at a point respectively. The drive pulley 2 is driven by a motor (not shown). When the motor rotates, the pulley 2 moves to pull the belt 4 and its torque is transmitted to the driven pulley 3. A finger 6 is mounted on the driven pulley 3, and with the movement of the driven pulley 3 the finger 6 performs a job on an object 7.

The pulley-belt driving system 5 is provided with a pair of torque sensors 20. One of the torque sensors 20 provided to detect the tension of the first (upper) part 4a of the belt 4 includes a beam 23 connected to a stationary body 15 at one end, a tension pulley 21 provided on the other end of the beam 23, and a pair of strain gauges 25 provided on the opposite sides of the beam 23. The other torque sensor 20 provided to detect the tension of the second (lower) part 4b of the belt 4 includes a beam 24 connected to the stationary body 15 at one end, a tension pulley 22 provided on the other end of the beam 24 and a pair of strain gauges 26 provided on the opposite sides of the beam 24. The tension pulley 21 and 22 are urged against the respective first part 4a and second part 4b of the belt 4.

The torque M of the driven pulley 3 is calculated by the equation (1):

$$M = R(T_1 - T_2) \qquad (1)$$
$$= [R/\{2 \sin(\theta/2)\}] \times (F_2 - F_1)$$
$$= k(V_2 - V_1)$$

where,
- M: torque of the driven pulley,
- R: radius of the driven pulley,
- $\theta$: inclination angle of the belt,
- $T_1$: tension in the first part 4a of the belt,
- $T_2$: tension in the second part 4b of the belt,
- $F_1$: force applied by the tension of the first part 4a of the belt to the pulley 21,
- $F_2$: force applied by the tension of the second part 4b of the belt to the pulley 22,
- k: proportionality constant,
- $V_1$: output from the strain gauges 25,
- $V_2$: output from the strain gauges 26.

FIG. 6 shows another example of the prior art torque sensor. This torque sensor 30 includes a tension sensor 31 mounted on the first (upper) part 4a of a belt 4 to detect the tension $T_1$ and a tension sensor 32 mounted on the second (lower) part 4b to detect the tension $T_2$. Reference numeral 11 designates a tension pulley. In this case, the torque M generated at the driven pulley 3 is given as $$M = R(T_1 - T_2) \qquad (2)$$

The above prior art torque sensors, however, have drawbacks. More specifically, the torque sensor 20 shown in FIG. 5 requires four strain gauges and two beams, so that its construction is rather complicated. In the torque sensor 30 shown in FIG. 6, the two tension sensors move together with the belt 4. Therefore, special consideration must be given to the wiring for obtaining the output signals from the tension sensors 31, 32 to avoid the damage of the wires during the motion.

Further, in the examples of FIG. 5 or 6, the tension difference $(T_2 - T_1)$, or the force difference $(F_2 - F_1)$ that is necessary for deriving the torque M of the driven pulley 3 is not obtained directly, but it is obtained after detecting $T_1$, $T_2$, $F_1$ and $F_2$ independently for processing detected signals. This means that additional operations are required.

OBJECT AND SUMMARY OF THE INVENTION

This invention has been completed with the above problems in mind, and its object is to provide a torque sensor of tension difference type suitable for a pulley-belt driving system, which is simple in construction and can directly detect the driven pulley torque through simple signal processing.

To attain the above object of the invention, there is provided a torque sensor for a pulley-belt driving system having a belt passed round drive and driven pulleys, and which comprises a frame for urging the belt in opposite directions, a beam secured to a stationary body and supporting the frame, and strain detection means for detecting the strain of the beam.

The tension difference between the two sides of the belt is proportional to the displacement of the frame, which in turn is proportional to the flexing of the beam. Thus, the transmitted torque difference between the two sides of the belt can be readily obtained from the value of the beam strain detected by the detection means.

The above and other objects and features of the invention will become more apparent from the following detailed description with reference to the accompanying drawings.

DETAILED DESCRIPTION OF THE PREFERRED EMBODIMENT

Figure 1:
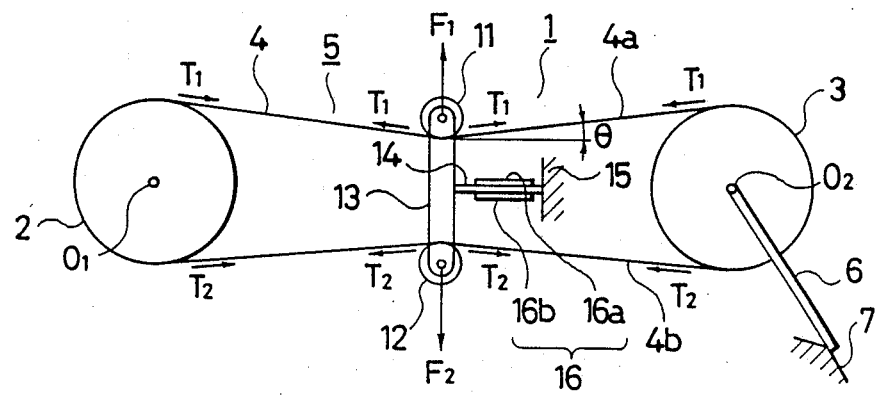
FIG. 1 is a schematic view showing an embodiment of the torque sensor according to the invention.

FIG. 1 shows the basic construction of a torque sensor according to the invention. Referring to FIG. 1, reference numeral 5 designates a pulley-belt driving system. The system 5 comprises a belt 4 passed round a drive pulley driven by a motor (not shown) and a driven pulley 3. The belt 4 is fixed at two points, one on the periphery of the drive pulley 2 and the other on the periphery of the driven pulley 3. In this case, it is desirable that the belt 4 be wound once on each of the drive and driven pulleys 2 and 3 and fixed at respective intermediate points of the wound belt 4 to the drive and driven pulleys 2 and 3 to increase the range of rotation of each of the drive and driven pulleys 2 and 3.

When the drive pulley 2 is driven by the motor, the torque of the drive pulley 2 is transmitted by the belt 4 to the driven pulley 3. A finger 6 of a robot is mounted on the driven pulley 3, and with the movement of the driven pulley 3 the finger 6 performs a job on an object 7.

The pulley-belt driving system 5 is provided with a torque sensor 1. The torque sensor 1 includes tension pulleys 11 and 12. The tension pulleys 11 and 12 are mounted on a frame 13. They may urge the respective first (upper) and second (lower) parts 4a and 4b either inwardly or outwardly so long as they urge the belt parts 4a and 4b in opposite directions. In the illustrated case, the tension pulleys 11 and 12 urge the first and second parts 4a an 4b of the belt 4 toward each other, i.e., inwardly. The frame 13 is supported at an intermediate portion to one end of a beam 14 having the other end fixed to a stationary body 15 and, therefore, when the drive pulley 2 is rotated by the motor in a clockwise direction, for example, the lower (second) part 4b of the belt 4 is stretched while the upper (first) part 4a of the belt is flexed. As a result, the frame 13 is moved downwardly as shown by an arrow $F_2$ in FIG. 1. A pair of strain gauges 16 (i.e., 16a and 16b) are mounted on the opposite side surfaces of the beam 14.

The tension pulleys 11 and 12 provided on the opposite ends of the frame 13 serve to give tension to the belt 4 and reduce the friction with the belt 4. In the case where the frame 13 has high rigidity in the direction of moving the belt 4, it is less liable to deform in the belt-moving direction during the movement of the belt 4. In this case, therefore, the belt 4 may be brought into sliding contact with the frame 13 by omitting the tension pulleys 11 and 12.

When a torque M is generated in the driven pulley 3, a tension difference $T_1-T_2$ arises between the tensions $T_1$ and $T_2$ of the first and second parts 4a and 4b of the belt 4.

Meanwhile, the forces $F_1$ and $F_2$ which are applied in a direction normal to the straight line connecting the centers $O_1$ and $O_2$ of rotation of the drive and driven pulleys 2 and 3 are respectively proportional to the tensions $T_1$ and $T_2$ and are represented by:

$$F_1 = 2T_1 \sin \theta$$

and $$F_2 = 2T_2 \sin \theta$$

where $\theta$ is the inclination angle of the belt 4.

Thus, denoting the radius of the driven pulley 3 by R, the torque M of the driven pulley 3 is expressed by:

$$\begin{aligned} M &= R(T_2 - T_1) \\ &= (R/2 \sin \theta)(F_2 - F_1) \\ &= kV \end{aligned} \quad (3)$$

where, k: proportionality constant,

V: output of stain gauges 16 (16a, 16b)

The force difference $F_1-F_2$ is proportional to the displacement of the frame 13, and the displacement of the frame 13 is proportional to the flexing of the beam 14. Thus, the torque M of the driven pulley 3 is obtained in proportion to the outputs of the strain gauges 16a and 16b. Therefore, there is no need of detecting the tensions $T_1$ and $T_2$ or forces $F_1$ and $F_2$ independently.

Figure 2:
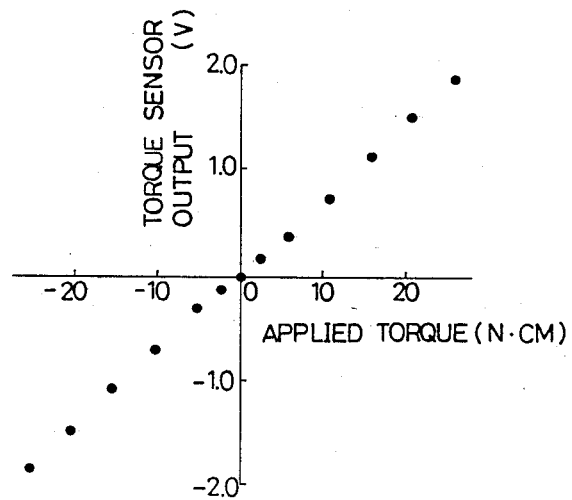
FIG. 2 is a graph showing the relation between the applied torque at a joint of a robot finger and the output of a torque sensor according to the invention.

FIG. 2 is a graph showing an experimentally obtained static characteristic of the sensor according to the invention. More specifically, the graph shows the results of detection via a strain amplifier of the outputs of the strain gauges 16a and 16b of the torque sensor 1 representing the moment generated about the center $O_2$ of rotation of the pulley 3 produced by locking the drive pulley 2 driven from the motor and applying a weight to the finger 6. In the graph the abscissa represents the torque applied to the finger and the ordinate represents the torque sensor output. Substantially the same linear characteristic as the linear characteristic obtained from the above relation could be obtained.

Figure 3:
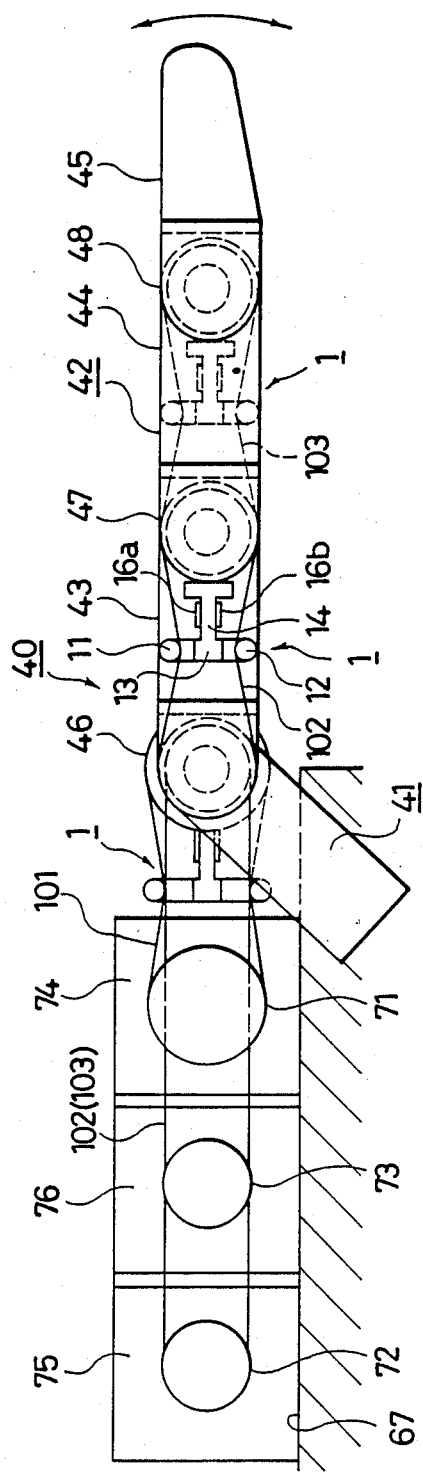
FIG. 3 is a front view showing an example of application of the invention, in which torque sensors according to the invention are incorporated in a finger of a multi-finger hand of a robot.
Figure 4:
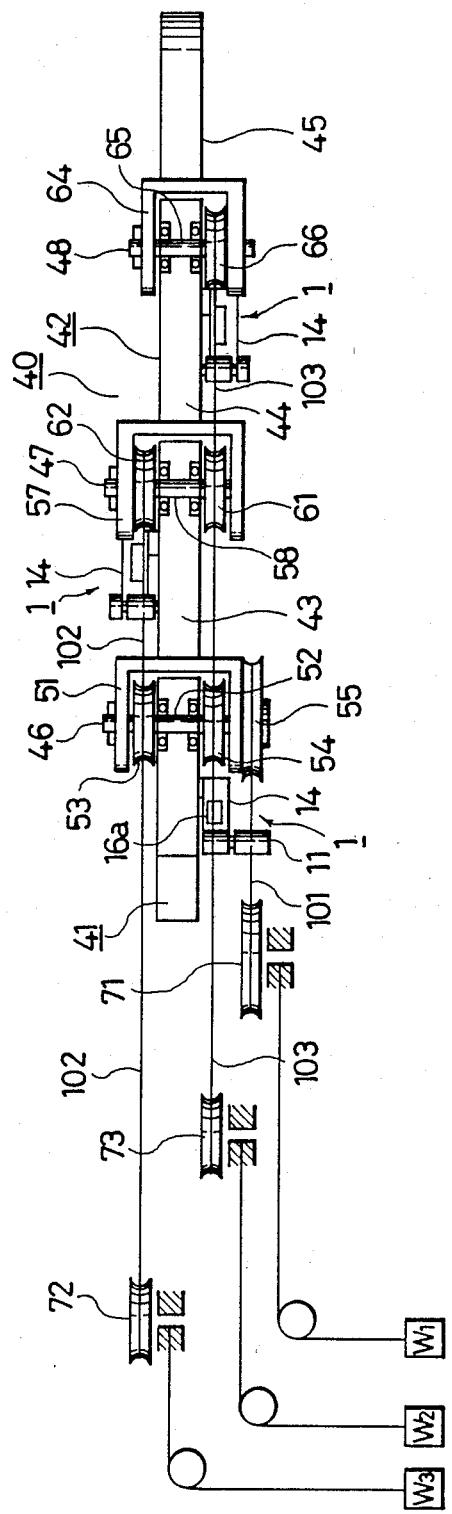
FIG. 4 is a plan view showing the robot hand shown in FIG. 3.

FIGS. 3 and 4 illustrate an example of detection of the torque of respective links of a robot hand 40 with torque sensors 1 according to the invention.

The robot hand 40 has a stationary link 41 and a finger 42. The finger 42 has first to third links 43 to 45. The first link 43 is coupled by a first joint 46 to the stationary link 41, the first link 43 and second link 44 are coupled to each other by a second joint 47, and the second link 44 and third link 45 are coupled to each other by a third join 48. The first joint 46 has a first joint frame 51 having a channel-shaped sectional profile, a shaft 52, free rotation pulleys 53 and 54 and a fixed rotation pulley 55. The fixed rotation pulle 55 is secured to the first joint frame 51, and the free rotation pulleys 53 and 54 are rotatably supported on an end of the stationary link 41. The first link 43 is secured to the first joint frame 51.

The second joint 47 has a second joint frame 57 having a channel-shaped sectional profile, a shaft 58, a fixed rotation pulley 62 and a free rotation pulley 61. The fixed rotation pulley 62 is secured to the second joint frame 57. The second link 44 is secured to the second joint frame 5,, and the shaft 58 is rotatably supported on an end of the first link 43.

The third joint 48 has a third joint frame 64 having a channel-shaped sectional profile, a shaft 65 and a fixed rotation pulley 66. The fixed rotation pulley 66 is secured to the third joint frame 64. The third link 45 is secured to the third joint frame 64, and the shaft 65 is rotatably supported on an end of the second link 44.

On the drive side, first to third drive pulleys 71 to 73 are mounted on a stationary body 67 and are driven from first to third motors 74 to 76, respectively.

A belt 101 is passed round the first drive pulley 71 and the fixed rotation pulley 55 of the first joint 46, a belt 102 is passed round the second drive pulley 72 and the fixed rotation pulley 62 of the second joint 47, and a belt 103 is passed round the third drive pulley 73 and fixed rotation pulley 66 of the third joint 48. The belt 101 are fixed at a point to the pulley 71 and at a point to the pulley 55. Likewise, the belts 102 and 103 are fixed at respective two points to the pulleys 72, 62 and to the pulleys 73, 66, respectively. The belts 101, 102 and 103 are stretched by respective weights $W_1$, $W_2$ and $W_3$.

A beam 14 of a torque sensor 1 with strain gauge 16a and 16b provided on the opposite side surfaces is secured at one end to each of the stationary, first and second links 41, 43 and 44. Each beam 14 supports a frame 13 at its free end. The frame 1 has pulleys 11 and 12 at the opposite ends. The pulleys 11 and 12 urge the associated one of the belts 101 to 103 from the opposite sides.

When the pulleys 71 to 73 are driven by driving first to third motors 74 to 76, the torque of the pulleys 71 to 73 is transmitted by the belts 101 to 103 to the first to third links 43 to 45 to cause rotation thereof about the respective shafts 52, 58 and 65. At this time, the torque of the first to third links is readily obtained from the tension difference between the first and second parts of the respective belts 101, 102, 103 as detected by the torque sensors 1 provided for the respective belts.

Figure 5:
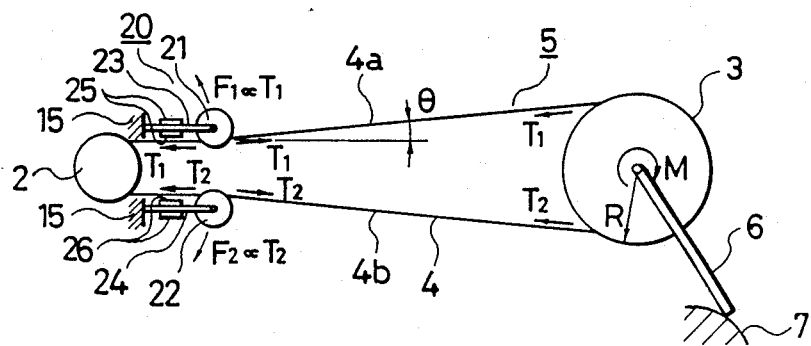
FIG. 5 is a schematic view showing a prior art torque sensor.

The torque sensor having the construction as described above according to the invention requires only two strain gauges i.e., only one half the number of strain gauges as the prior art torque sensor shown in FIG. 5, so that it is possible to simplify the construction and reduce the cost of the torque sensor.

In addition, with the torque sensor according to the invention the strain gauge is at a fixed position and does not move. Thus, unlike the prior art torque sensor shown in FIG. 6, the wirings connected to the tension sensors do not moved together with the belt, so that no special means is required to allow for their movement.

Figure 6:
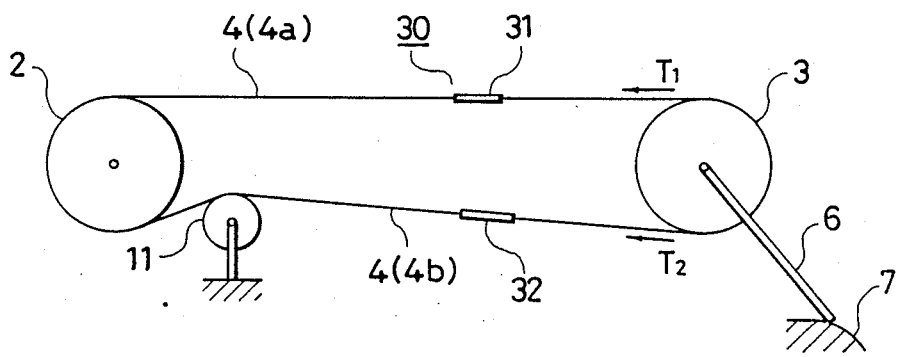
FIG. 6 is a schematic view showing a different prior art torque sensor.

Further, unlike the torque sensor shown in FIGS. 5 and 6, with the torque sensor according to the invention the difference necessary for determining the torque is not calculated from independently detected tensions $T_1$ and $T_2$ or forces $F_1$ and $F_2$ but is directly detected, so that the operational process is simplified.

What is claimed is:

1. A torque sensor for a pulley-belt driving system having a belt passed around a drive pulley and a driven pulley, comprising:
   a frame having opposite ends respectively in contact with first and second parts of said belt to urge said belt in opposite directions, whereby said frame displaces in response to a tension difference between said first and second parts of said belt;
   means for measuring the displacement of the frame, comprising a beam having one end fixed to an intermediate portion of said frame at right angles relative to said frame and between said first and second parts of said belt, whereby said beam bends with a displacement of said frame;
   a stationary body having the other end of said beam fixed thereto for supporting said frame; and
   strain detection means provided on said beam for detecting the strain of said beam.

2. The torque sensor according to claim 1, further comprising a pair of tension pulleys rotatably supported by the respective opposite ends of said frame so as to be in contact with the respective first and second parts of said belt.

* * * * *